United States Patent
Lynn et al.

(10) Patent No.: US 12,316,379 B2
(45) Date of Patent: May 27, 2025

(54) REMOTE OPTICAL ANALOG SENSOR SOLUTIONS

(71) Applicant: NETGAMI SYSTEM L.L.C., Short Hills, NJ (US)

(72) Inventors: John Lynn, Easton, PA (US); Eric Lynn, Easton, PA (US)

(73) Assignee: NETGAMI SYSTEM L.L.C., Short Hills, NJ (US)

( * ) Notice: Subject to any disclaimer, the term of this patent is extended or adjusted under 35 U.S.C. 154(b) by 234 days.

(21) Appl. No.: 18/200,645

(22) Filed: May 23, 2023

(65) Prior Publication Data

US 2024/0396633 A1    Nov. 28, 2024

(51) Int. Cl.
*H04B 10/25* (2013.01)
*G02B 6/42* (2006.01)

(52) U.S. Cl.
CPC .............. *H04B 10/25* (2013.01); *G02B 6/42* (2013.01)

(58) Field of Classification Search
CPC ................................. H04B 10/25; G02B 6/42
USPC ......................................................... 398/116
See application file for complete search history.

(56) References Cited

U.S. PATENT DOCUMENTS

| | | | |
|---|---|---|---|
| 2003/0169956 A1* | 9/2003 | Lange | G01C 19/64 385/12 |
| 2005/0184260 A1* | 8/2005 | Fageraas | G01V 1/22 250/573 |
| 2012/0147381 A1* | 6/2012 | LeBlanc | E21B 47/135 385/33 |
| 2017/0353248 A1* | 12/2017 | Booman | H04B 10/801 |
| 2018/0292549 A1* | 10/2018 | Xu | G01T 1/208 |
| 2019/0154468 A1* | 5/2019 | Jansen | H04B 10/071 |
| 2023/0095024 A1* | 3/2023 | Redding | G01L 1/246 73/862.624 |

* cited by examiner

*Primary Examiner* — Dalzid E Singh
(74) *Attorney, Agent, or Firm* — Birch, Stewart, Kolasch & Birch, LLP

(57) ABSTRACT

An optical fiber link includes a remote optical analog sensor; an optical analog sensor local controller for generating a laser beam; and a pair of fiber cable link including a up fiber and a down fiber and connected between the optical analog sensor local controller and the remote optical analog sensor. The power strength of the laser beam transmitted from the optical analog sensor local controller to the remote optical analog sensor through the down fiber is modulated in the remote analog optical sensor.

15 Claims, 6 Drawing Sheets

REMOTE OPTICAL ANALOG SENSOR SOLUTIONS

BACKGROUND OF THE INVENTION

1. Field of the Invention

The present invention relates to an optical fiber link, particularly to an optical fiber link which provides an optical link with the unidirectional communication channel without power for the remote optical analog sensors. The present invention can provide remote optical analog sensors transmission with very low power or powerless in one pair of fiber optical cable.

2. Background of the Invention

An optical link for a low power remote sensor optical communication could include local host control devices, fiber links, functional blocks, and the remote sensor devices. FIG. 1 illustrates a low power remote sensor optical communication links solution. The local host control device 10 communicates with remote sensor device 20 through the fiber cable. Normally, the Microcontroller Unit (MCU) 11 generates the control or communication data and converts it to the host transmitting (HTX) signals, HIGH or LOW, and sends the HTX signals to the electrical-to-optical (E/O) converter 12 which converts the HTX signals to the laser beam optical signals. When the HTX is in HIGH state, the laser beam will be turned on or in high power state. When the HTX is in LOW state, the laser beam will be turned off or in low power state. The laser beam optical signals are carried by the downstream fiber link 31 to the Optical gate 21 of the remote sensor devices which converts the laser beam's high and low power states to the sensor receiving (SRX) signals, HIGH or LOW state, then sends the SRX signal to the sensor device 22. The sensor device 22 sends the sensor transmitting (STX) signals, HIGH or LOW state, to the Optical gate 21 which passes or block the laser beam high power and low power optical signals with the STX signals, HIGH or LOW state. The laser beam optical signals are carried by the upstream fiber link 32 to O/E converter 13 of the local host control device 10 which converts the laser beam optical signal to the host receiving (HRX) signals, HIGH or LOW state. This signal is then received by the MCU 11. The MCU 11 calculates and recovers the STX signals from the sensor device 22.

For the remote powerless optical analog sensor applications, the communication only can provide digital HIGH or LOW state. It is not a good solution to transmit analog signals for the most of the remote sensor applications which require remote analog sensors.

SUMMARY OF THE INVENTION

Accordingly, it is an objective of the present invention to provide an optical fiber link method for low power or powerless remote analog sensors applications with a pair of fiber optical link.

BRIEF DESCRIPTION OF THE DRAWINGS

The present invention will become better understood from the detailed description given hereinbelow and the accompanying drawings which are given by way of illustration only, and thus are not limitative of the present invention, and wherein.

DETAILED DESCRIPTION OF THE PREFERRED EMBODIMENTS

In the previous patent, one remote sensor is only for Logic HIGH or LOW state by using one pair of fiber cable link. This is not a practical design for the analog remote sensor applications. In order to improve the system to service the remote analog sensors with one pair of fiber cable link, the present invention uses Collimator to increase the laser beam's light spot size so that the Optical Gate can move within the light spot to pass partial laser beam through the Optical Gate to transfer the Optical Gate moving to modulated optical power strength to become moving's analog optical signal strength. The partial optical power/laser beam is recovered by the analog Optical to Electrical Converter to analog electrical signal. Since the optical light spot is a Gaussian distribution, to using the Gaussian compensation to recover the signal to the original moving signal.

Figure 1:
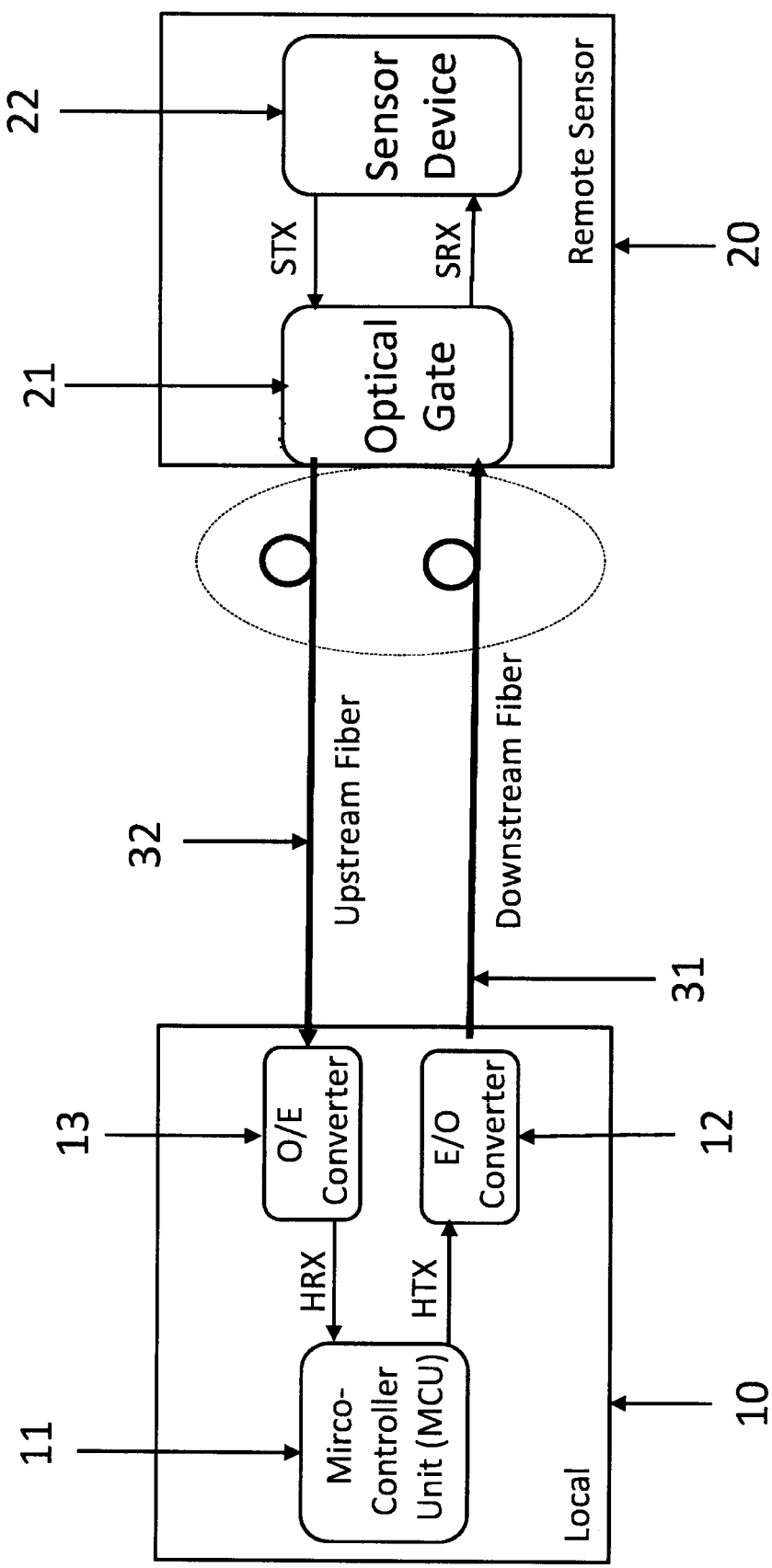
FIG. 1 is a schematic drawing of a low power remote sensor optical gate communication links solution.
Figure 2:
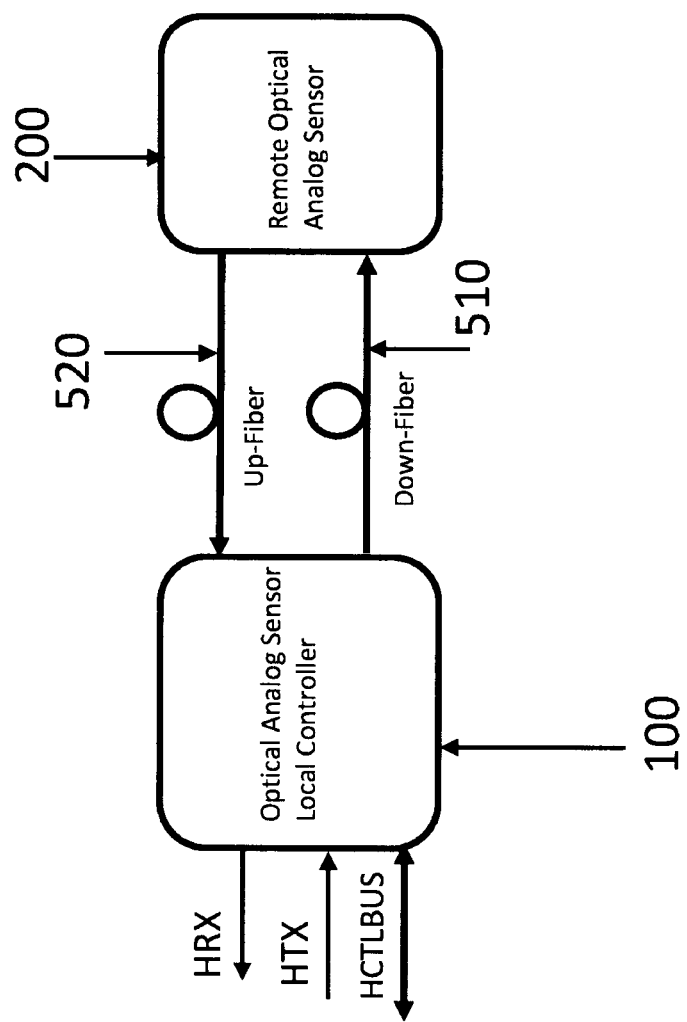
FIG. 2 is a schematic drawing of the optical fiber link for powerless remote optical analog sensors solution of the present invention.

In FIG. 2, the presented Remote Optical Analog Sensor solution's functional block includes Optical Analog Sensor Local Controller 100, a pair of fiber link 510 and 520, and Remote Analog Optical Sensor 200. The Optical Analog Sensor Local Controller 100 provides the laser beam's light source which is controlled by the HTX and HCTLBUS (Host Control BUS) and carried by the Down-Fiber 510 to Remote Analog Optical Sensor 200. The laser beam is modulated in Remote Analog Optical Sensor 200 then returned to Optical Analog Sensor Local Controller 100 by the Up-Fiber 520 and recovered the optical signal to electrical analog signal to HRX.

Figure 3:
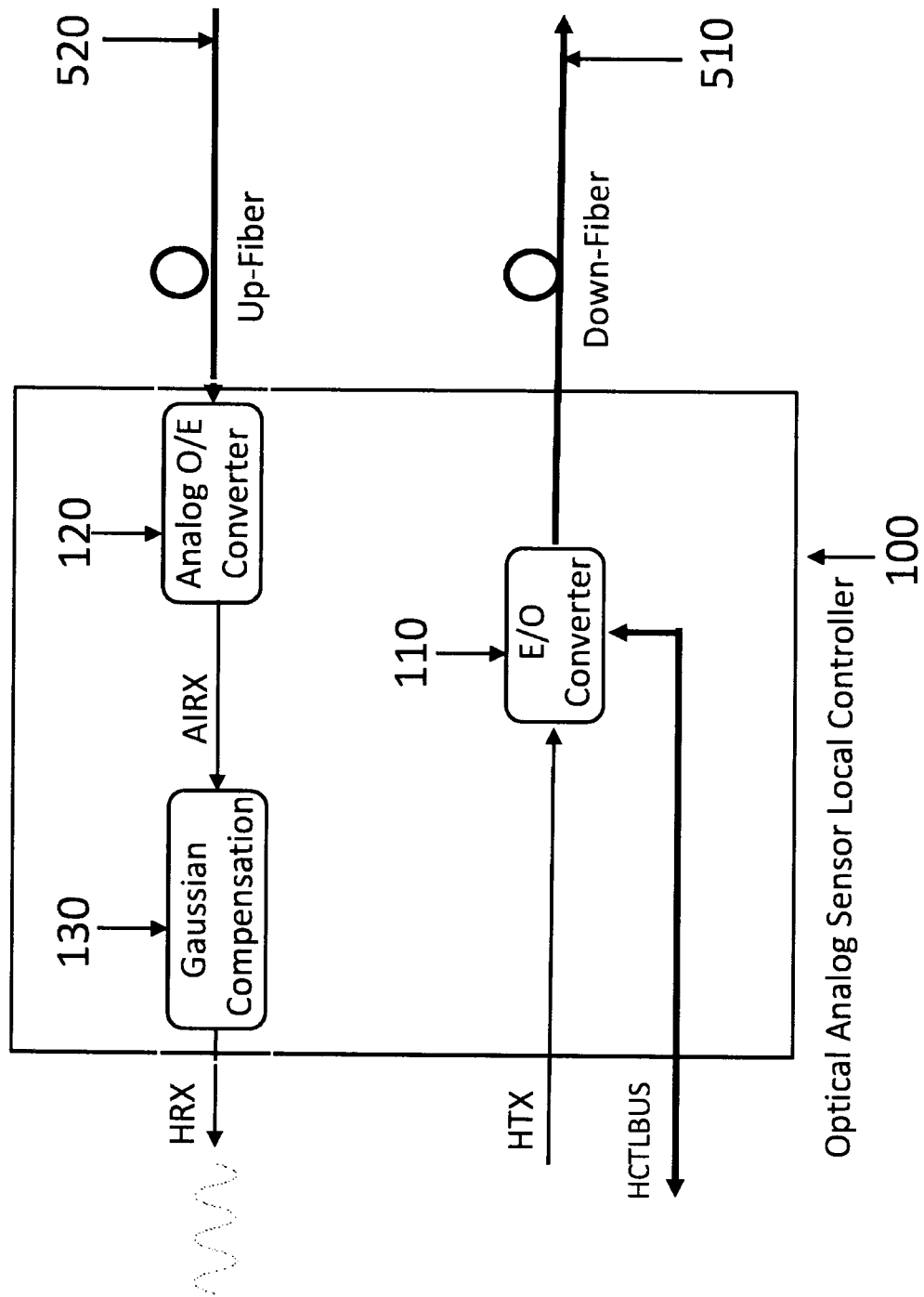
FIG. 3 is a schematic drawing of the functional block of the Optical Analog Sensor Local Controller design of the present invention.

The Optical Analog Sensor Local Controller 100, in FIG. 3, provides the service signals, HTX, HRX, and HCTLBUS interface for external access. The external device sends the HTX to Electrical to Optical Converter, E/O 110, to enable the laser beam light source from the E/O converter for the Remote Optical Analog sensor's 200 Optical Gate when the HTX is in HIGH logic level. The external device controls the laser beam's output power based on the received laser beam power level from the Optical to Electrical converter, O/E 120, by the HCTLBUS signals. The HCTLBUS is a serial interface, like the I2C interface. The serial interface is used to read/write the E/O and O/E Converters operating commands, status, and enable or disable the E/O and O/E Converters. If the received laser beam power level is lower than setting value, the external device will increase the Electrical to Optical converter, E/O's, output power to maintain the optical loop in good operating condition. This could happen when the remote sensor 200 is far away from the controller 100. If the received laser beam is higher than the setting value, the external device will reduce the Electrical to Optical converter, E/O's, output power through the HCTLBUS. This could happen when the remote sensor 200 is very close to the controller 100. The service signal, HTX, controls the Electrical to Optical converter, E/O 110, to generate the laser beam to the Down-Fiber link 510. The laser beam from the UP-Fiber link 520 is sent to the Analog Optical to Electrical, O/E 120, converter and converts to electrical analog signal, AIRX. Because the AIRX is a Gaussian distribution signal, it requires post-process with the Gaussian compensation circuit 130 to convert the signal back to analog moving electrical signal, HRX. The HRX is accessed by the external device.

Figure 4:
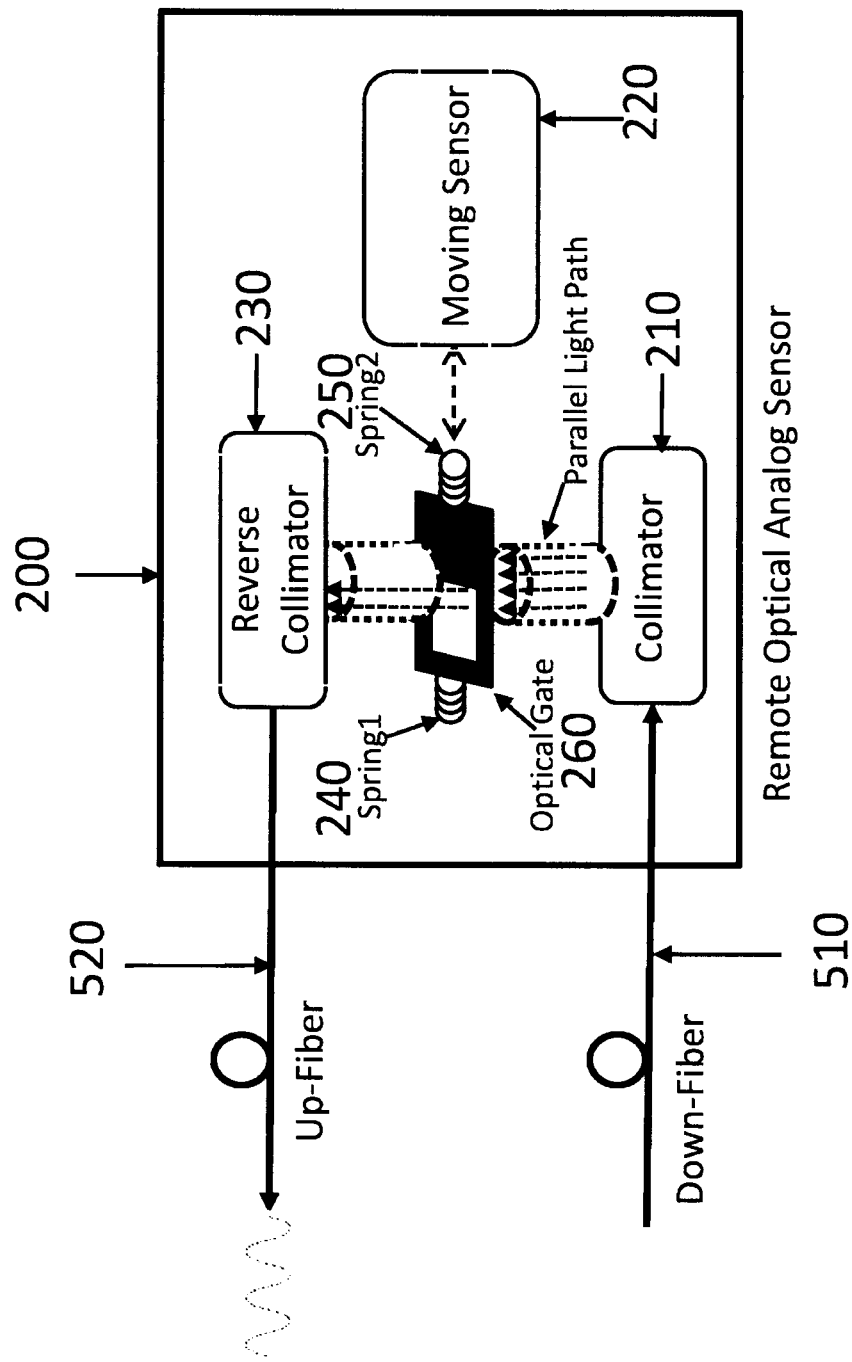
FIG. 4 is a schematic drawing of the functional block of the Remote Optical Analog Sensor design of the present invention.

The Remote Optical Analog Sensor 200, in FIG. 4, uses Collimator 210 to expand the light parallel large size light spot, the light spot could be a cycle with diameter in hundreds μm to several mm size, from Down-Fiber1 510. The parallel light spot transmits through air and reach the Reverse Collimator 230 to convert the parallel light to Up-Fiber 520. When the parallel light is in the air, by using an Optical Gate 260 which is attached to Spring1 240 and Spring2 250 and linked to Moving sensor 220, with open window to let partial laser light can pass through. As the Optical Gate 260 moves in vertical direction to the parallel light path, the Optical Gate 260 controls or modulates how much light passes through the Optical Gate's window from Collimator 210 to the Reverse Collimator 230. The Optical Gate 260 converts the Gate's movement to optical light strength or optical signal change. Because the laser beam is a so called Gaussian distribution light spot, the light passes through the Optical Gate 260 will also be modulated as Gaussian distribution optical power. The modulated optical signal is not the original moving signal. It will require Gaussian Compensation circuit 130 to recover the modulated optical signal to the original moving signal. This compensation is done on Optical Analog Sensor Local Controller 100.

Figure 5:
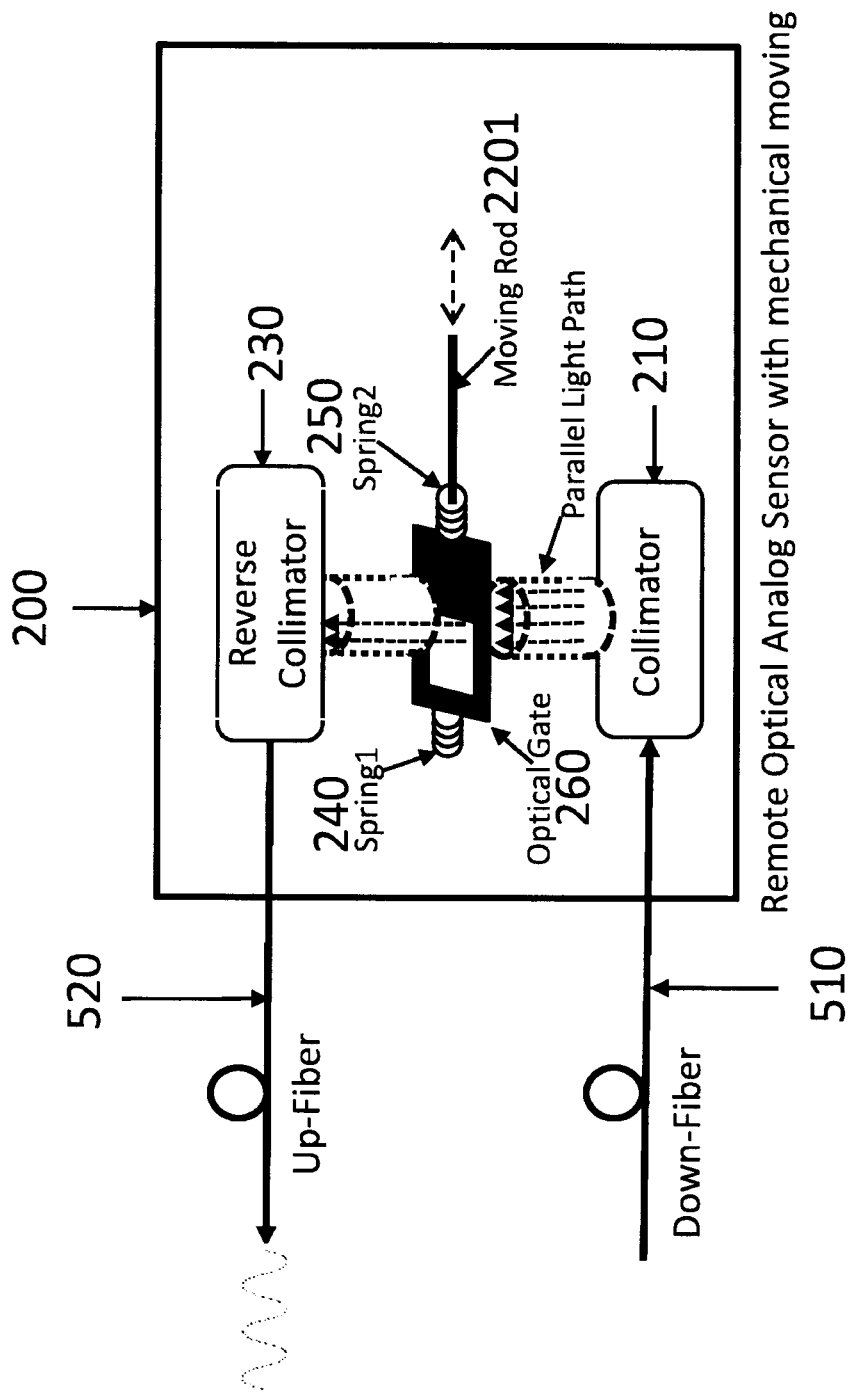
FIG. 5 is a schematic drawing of the functional block of the Remote Optical Analog Sensor with Mechanical Moving.

In FIG. 5, one of the methods of the Moving Sensor 220 is pure mechanical structure. By using mechanical connection through the Moving Rod 2201 which directly attaches to the Optical Gate 260 to external Moving part. As the Moving Rod 2201 shift in vertical direction to the parallel light path, it will perform the light signal modulating operation. No extra electrical power required to drive the Optical Gate 260 in this mechanical structure.

Figure 6:
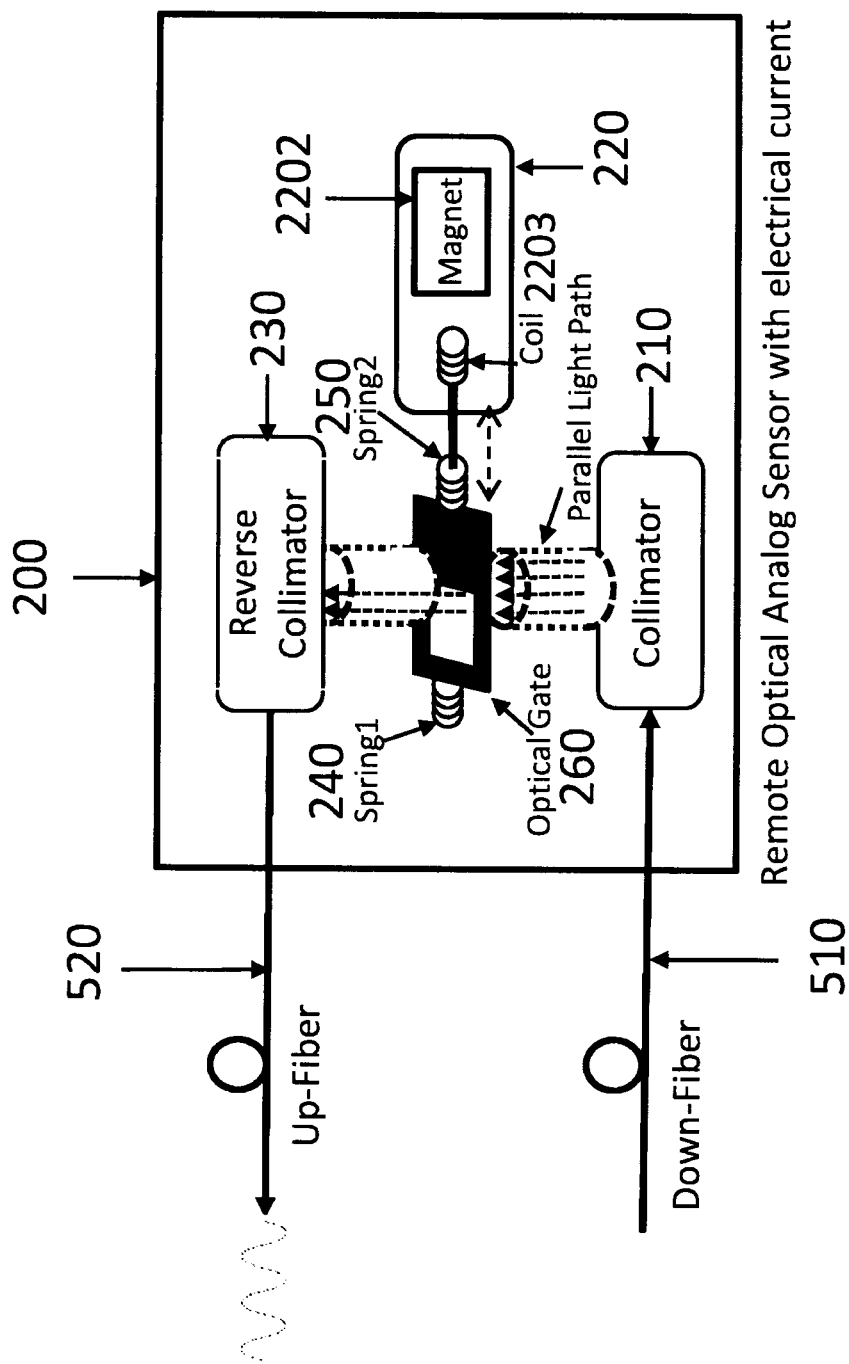
FIG. 6 is a schematic drawing of the functional block of the Remote Optical Analog Sensor with Electrical Current.

In FIG. 6, another method of the Moving Sensor 220 requires very low electrical power by using a coil 2203 and magnet design 2202. When applying electrical current to the coil 2203, the Optical gate 260 will be moved by the coil's magnetic force, close or away, from the magnet 2202. It will perform the optical signal modulating operation. It requires very low electrical current/power to drive the coil 2203.

The invention being thus described, it will be obvious that the specifics of the present invention may be varied in many ways. Such variations are not to be regarded as a departure from the spirit and scope of the invention, and all such modifications as would be obvious to one skilled in the art are intended to be included within the scope of the following claims.

What is claimed is:

1. An optical fiber link, comprising:
   a remote optical analog sensor;
   an optical analog sensor local controller configured to generate a laser beam; and
   a pair of fiber cable link including a up fiber and a down fiber and connected between the optical analog sensor local controller and the remote optical analog sensor,
   wherein the remote optical analog sensor is configured in such a manner that a power strength of the laser beam transmitted from the optical analog sensor local controller to the remote optical analog sensor through the down fiber is modulated in the remote analog optical sensor,
   and wherein the remote optical analog sensor comprises:
      a collimator connected to the down fiber and configured to increase a light spot size of the laser beam from the down fiber and form a parallel light path;
      an optical gate configured to let partial of the parallel light path to pass through;
      a reverse collimator connected to the up fiber and configured to receive the partial of the parallel light path passed through the optical gate, and converted the partial of the parallel light path to the up fiber.

2. The optical fiber link according to claim 1, wherein the optical analog sensor local controller comprises:
   an electrical to optical converter connected to the down fiber;
   an analog optical to electrical converter connected to the up fiber; and
   a Gaussian compensation circuit connected to the analog optical to electrical converter.

3. The optical fiber link according to claim 1, wherein the optical gate includes an open window to let the partial of the parallel light path to pass through.

4. The optical fiber link according to claim 1, wherein the optical gate is connected to a pair of springs and disposed therebetween, and is movable in a direction vertical to the parallel light path.

5. The optical fiber link according to claim 4, wherein the optical gate is connected to a moving sensor that is configured to move the optical gate.

6. The optical fiber link according to claim 5, wherein the moving sensor comprises a moving rod directly attached to the optical gate, and configured to move in the direction vertical to the parallel light path so as to drive the optical gate to move in the direction vertical to the parallel light path.

7. The optical fiber link according to claim 6, wherein the moving sensor is not equipped with an electrical power.

8. The optical fiber link according to claim 5, wherein the moving sensor comprises a coil and a magnet, and the magnet is configured to drive the optical gate to move in the direction vertical to the parallel light path when the coil is supplied with an electrical current.

9. A method of using the optical fiber link according to claim 1, comprising the steps of:
   generating the laser beam in the optical analog sensor local controller;
   passing the laser beam to the remote optical analog sensor via the down fiber;
   modulating the power strength of the laser beam transmitted from the optical analog sensor local controller via the down fiber in the remote analog optical sensor;
   passing the modulated laser beam back to the optical analog sensor local controller via the up fiber.

10. A method of using an optical fiber link, the optical fiber link comprising:
    a remote optical analog sensor;
    an optical analog sensor local controller configured to generate a laser beam; and
    a pair of fiber cable link including a up fiber and a down fiber and connected between the optical analog sensor local controller and the remote optical analog sensor, wherein the remote optical analog sensor is configured in such a manner that a power strength of the laser beam transmitted from the optical analog sensor local controller to the remote optical analog sensor through the down fiber is modulated in the remote analog optical sensor, the method comprising the steps of:

generating the laser beam in the optical analog sensor local controller;

passing the laser beam to the remote optical analog sensor via the down fiber;

modulating the power strength of the laser beam transmitted from the optical analog sensor local controller via the down fiber in the remote analog optical sensor;

passing the modulated laser beam back to the optical analog sensor local controller via the up fiber, wherein the optical analog sensor local controller comprises:

an electrical to optical converter connected to the down fiber;

an analog optical to electrical converter connected to the up fiber; and a Gaussian compensation circuit connected to the analog optical to electrical converter, wherein the method further comprises the step of controlling the electrical to optical converter to generate the laser beam to the down fiber, and wherein the step of passing the modulated laser beam back to the optical analog sensor local controller comprises the steps of:

passing the modulated laser beam back to the analog optical to electrical converter;

converting the modulated laser beam to an electrical analog signal by the analog optical to electrical converter; and converting the electrical analog signal to an analog moving electrical signal by the Gaussian compensation circuit.

11. A method of using an optical fiber link, the optical fiber link comprising:

a remote optical analog sensor;

an optical analog sensor local controller configured to generate a laser beam; and a pair of fiber cable link including a up fiber and a down fiber and connected between the optical analog sensor local controller and the remote optical analog sensor, wherein the remote optical analog sensor is configured in such a manner that a power strength of the laser beam transmitted from the optical analog sensor local controller to the remote optical analog sensor through the down fiber is modulated in the remote analog optical sensor, the method comprising the steps of:

generating the laser beam in the optical analog sensor local controller;

passing the laser beam to the remote optical analog sensor via the down fiber;

modulating the power strength of the laser beam transmitted from the optical analog sensor local controller via the down fiber in the remote analog optical sensor;

passing the modulated laser beam back to the optical analog sensor local controller via the up fiber, wherein the remote optical analog sensor comprises:

a collimator connected to the down fiber;

an optical gate having an open window to let partial of the parallel light path to pass through;

a reverse collimator connected to the up fiber, and wherein the step of modulating the power strength of the laser beam comprises the steps of:

increasing a light spot size of the laser beam from the down fiber and forming a parallel light path by the collimator;

moving the optical gate to change an amount of the parallel light path to pass through the optical gate so as to change the power strength of the laser beam; and receiving and converting the partial of the parallel light path passed through the optical gate to a modulated laser beam to the up fiber.

12. The method according to claim 11, wherein the optical gate is connected to a moving sensor that is configured to move the optical gate.

13. The method according to claim 12, wherein the moving sensor comprises a moving rod directly attached to the optical gate, and configured to move in the direction vertical to the parallel light path so as to drive the optical gate to move in the direction vertical to the parallel light path.

14. The method according to claim 13, wherein the moving sensor is not equipped with an electrical power.

15. The method according to claim 12, wherein the moving sensor comprises a coil and a magnet, and the magnet is configured to drive the optical gate to move in the direction vertical to the parallel light path when the coil is supplied with an electrical current.

* * * * *